United States Patent Office 3,576,613
Patented Apr. 27, 1971

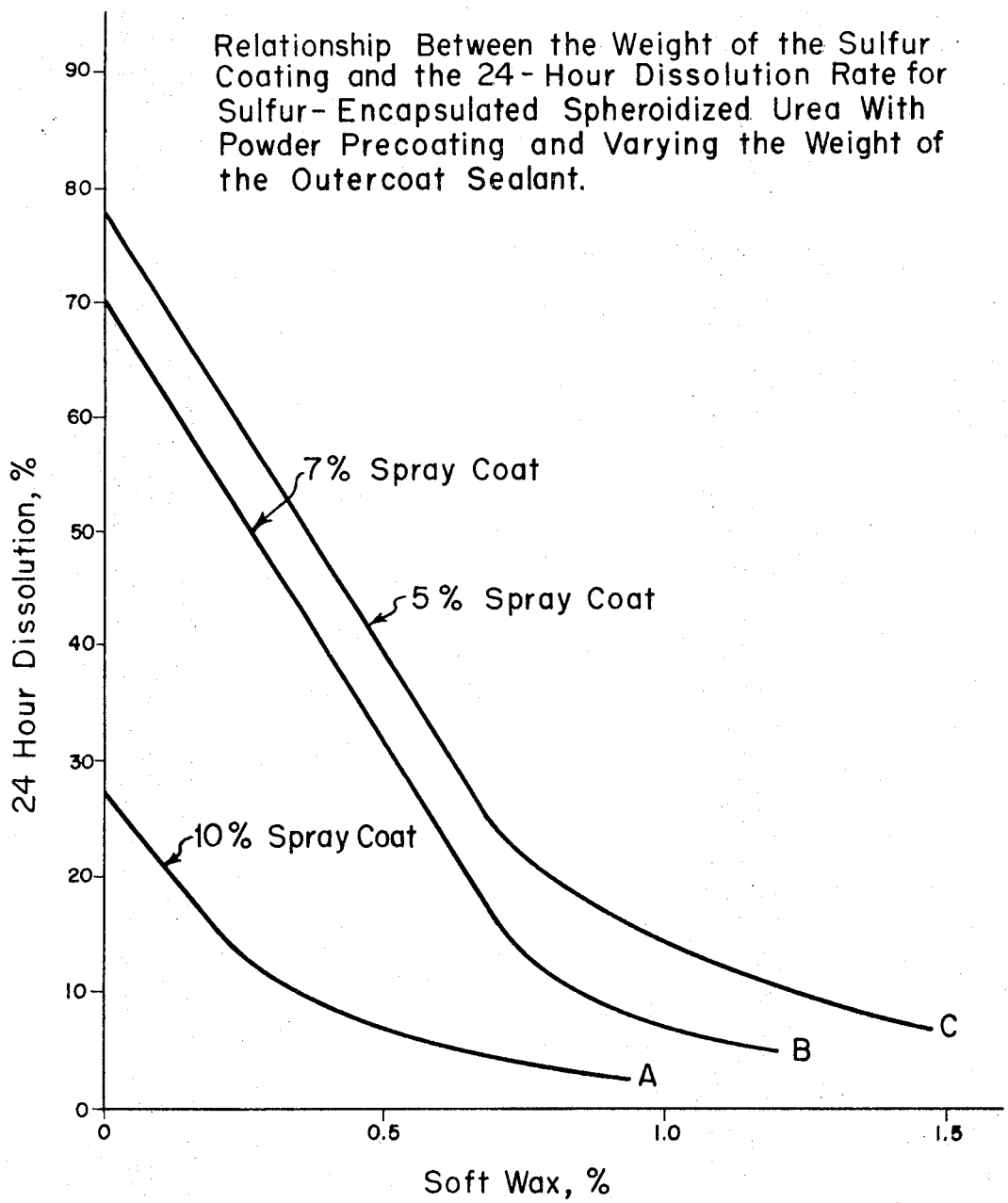

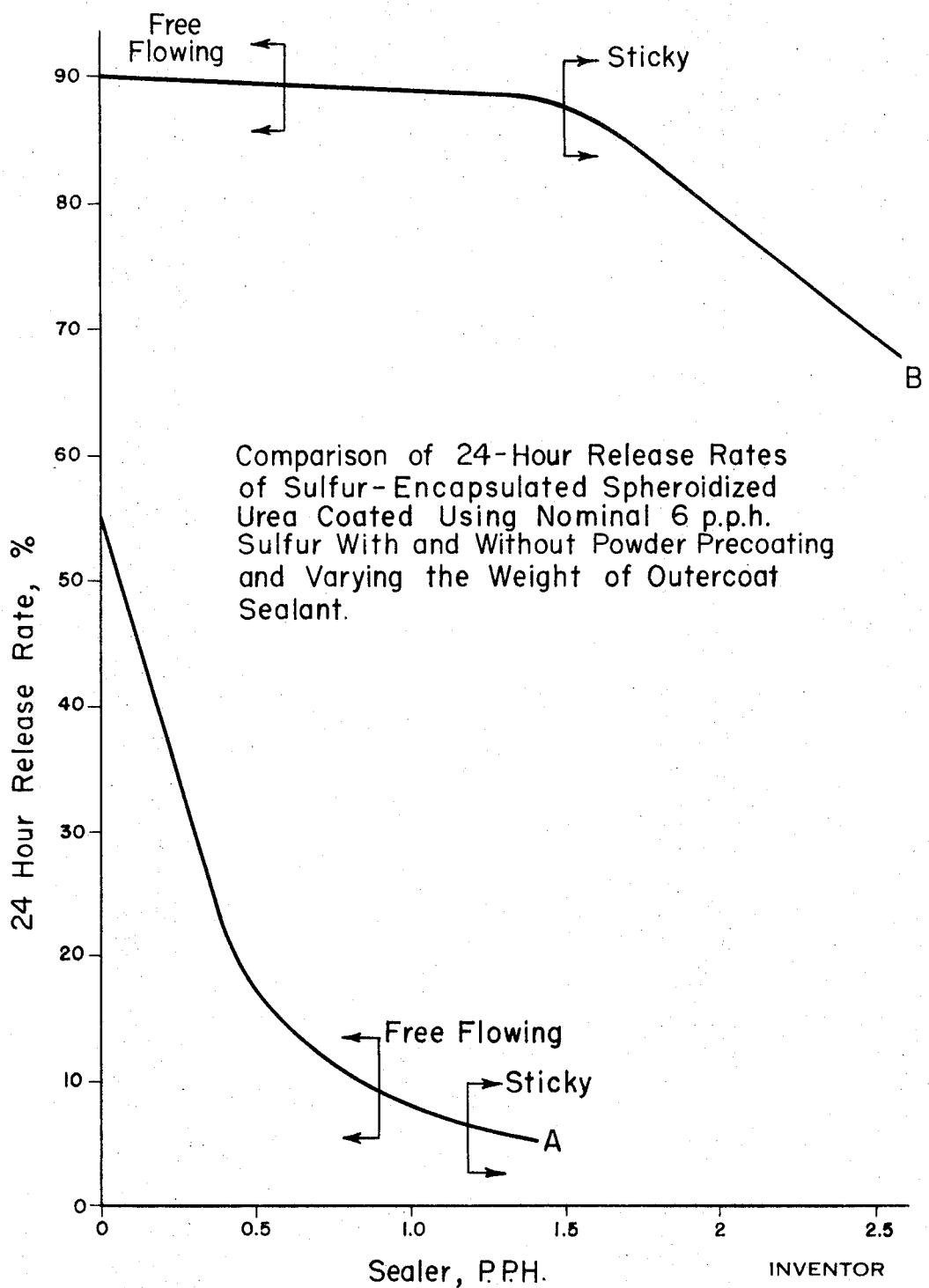

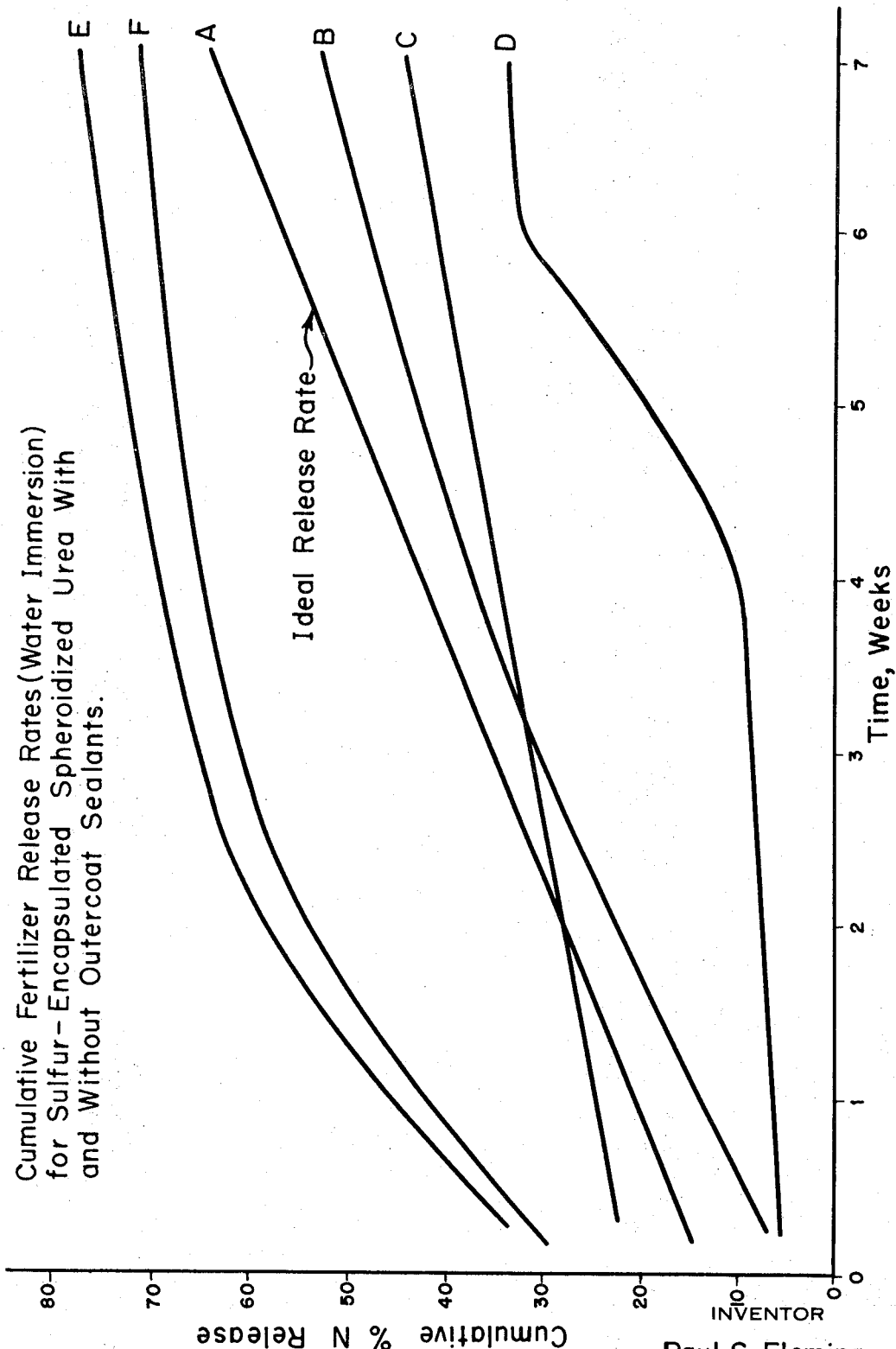

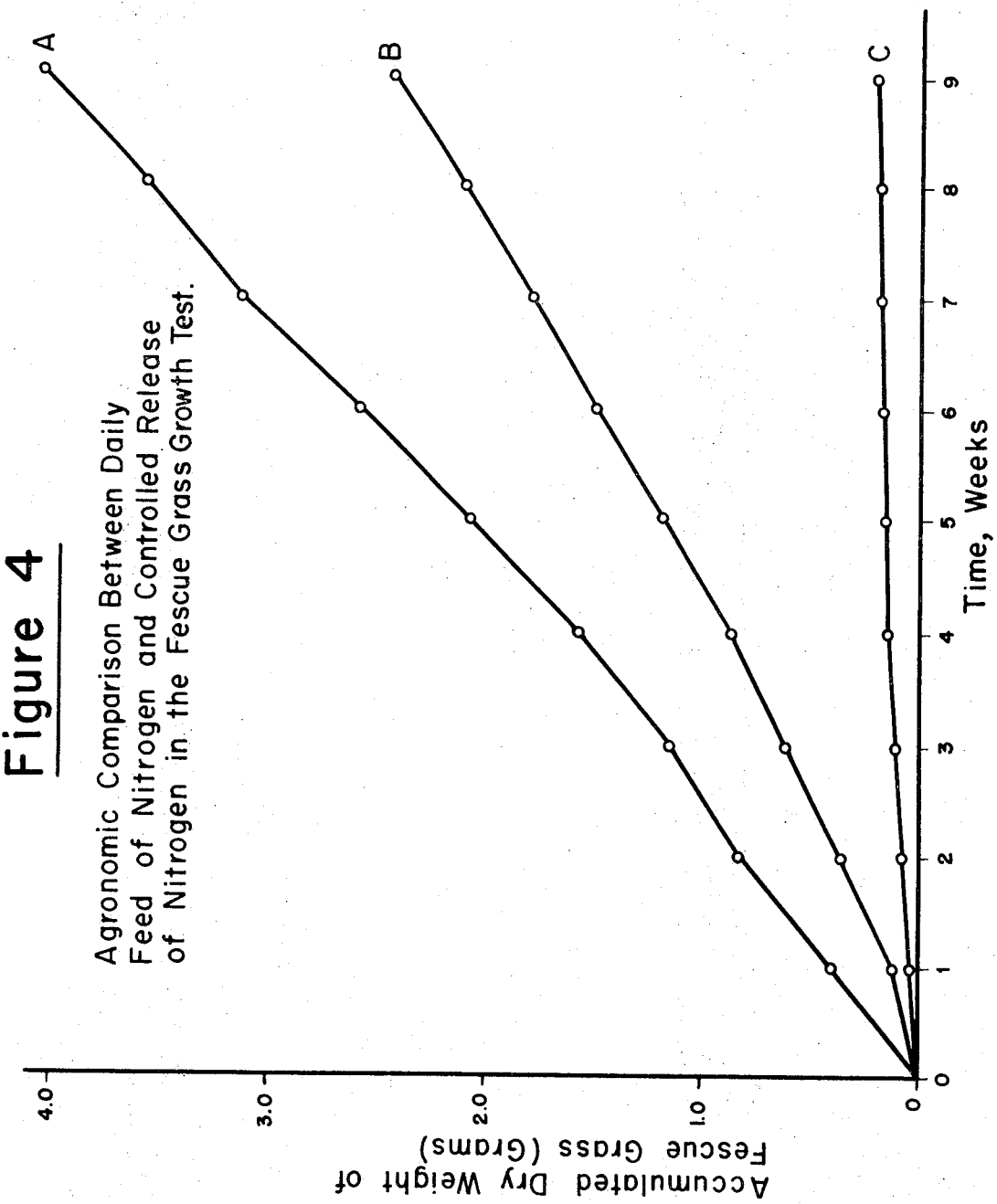

3,576,613
SULFUR ENCAPSULATION OF FERTILIZERS TO PROVIDE CONTROLLED DISSOLUTION RATES
Paul S. Fleming, Cheltenham, Pa., assignor to Thiokol Chemical Corporation
Filed July 24, 1967, Ser. No. 655,397
Int. Cl. C05c 9/00
U.S. Cl. 71—28                                                                      16 Claims

ABSTRACT OF THE DISCLOSURE

Certain finely divided powders have been found to be unusually effective in reducing the contact angle between the surface of solid fertilizer pellets and molten sulfur, the effect of which phenomenon allows molten sulfur to "wet" the surface of the fertilizer pellets more easily, when a thin layer of the finely divided powder is interposed between the fertilizer surface and the molten sulfur. By using a small amount of one of these finely divided powders as a subcoating immediately adjacent to and surrounding each fertilizer pellet, it is possible to produce sulfur-encapsulated fertilizer pellets adapted for use in soil to provide a controlled release of the fertilizer nutrients at a rate predetermined for the metabolic needs of a particular crop plant, using much less sulfur than would be required to achieve comparable results absent the powder-subcoat.

INTRODUCTION

This invention relates to coated fertilizers, and more particularly, to sulfur-encapsulated fertilizers (or "sulfur-coated fertilizers," the two terms being used interchangeably) which may be used in soil to provide a controlled dissolution of the fertilizer material at a rate approximately equal to the demands of a growing plant. The invention is based upon the discovery that certain finely divided powders, when dusted onto fertilizer pellets to form a subcoating which is immediately adjacent to and surrounds the pellets, are unusually effective in reducing the contact angle between the surface of the underlying fertilizer pellet and molten sulfur so that much less sulfur is required to form an effective barrier coating around the fertilizer pellets. The invention provides improved sulfur-encapsulated fertilizers, as well as an efficient and effective process for the production of sulfur-encapsulated fertilizer pellets adapted for use in soil to provide a controlled dissolution of the fertilizer nutrients at a rate predetermined for the metabolic needs of a crop plant.

DEVELOPMENT OF CONTROLLED RELEASE FERTILIZERS

Agronomic theory dictates that the most effective fertilizer is one from which the plant nutrients will be released at a rate exactly equal to the demands of the growing plant. Because the development of such agronomically ideal fertilizers is now regarded as a maxim in the fertilizer industry, intensive research has been and continues to be directed toward the development of fertilizers that release plant nutrients at a controlled rate. If the present trend of these research programs culminates in the production of controlled-release fertilizers at costs equal to or only incrementally higher than the present costs of producing the common and readily available fertilizer materials, it is generally recognized that fertilizers with controlled release of nutrients will be extensively used in the production of specialized, high-acre value crops in the United States. Most agronomists predict, however, that the major impact of controlled-release fertilizers will be on agriculture in tropical or substropical regions, where rainfall is heavy and soils are rapidly depleted of nutrients through leaching or where crop yields are low because of high phosphate fixation by iron and aluminum. In such tropical or semitropical regions, the use of controlled-release fertilizers is expected to significantly improve plant-use efficiency of added nutrients and to furnish a partial answer to the perennial problem of obtaining increased productivity.

Historically, much of the early research activity concerning controlled release of nutrients was based on altering the chemical or physical characteristics of the fertilizer material. Such research activity resulted in the development of the widely used urea-formaldehyde fertilizers, as well as in the concepts of using chelated micronutrients and micronutrients incorporated into glass frits. Further research on new compounds with reduced solubility has led to the development of oxamide and the metal ammonium phosphates as possible fertilizers for controlled release of nutrients. Since the release of nutrients from oxamide and the metal ammonium phosphates is a function of the particle size of the granule, a mixture of differing granule sizes of such compounds has been suggested as a method for supplying immediate and long-term crop needs for nitrogen. Because of excessive costs, however, the use of such low solubility compounds as a nitrogen fertilizer in commercial farming operations is not yet feasible.

More recently, there has been a surge of research activity on the concept of providing controlled release of plant nutrients by covering the fertilizer granules with water-resistant or impermeable coatings. Materials investigated as coating agents for fertilizers include various synthetic polymers (such as polyethylene and polyvinyl acetate), waxes, paraffin compounds, asphaltic mixtures, and sulfur. Compared to the older technique of providing slow release of plant nutrients by altering the chemical or physical characteristics of the fertilizer compound, coating the fertilizer with a water-resistant or impermeable barrier for slow release has several distinct advantages, the most important of which are, *firstly*, that coated fertilizers may be produced from the common and readily available fertilizer materials; *secondly*, that the fertilizer ratio in such products can be formulated in almost any nutrient combination; and, *thirdly*, that the necessary micronutrients and secondary elements can be combined with primary nutrients. Published experimental data have shown that coated fertilizers with suitable barrier layers slowly release the plant nutrients over a period of several months, which slow release prevents leaching losses early in the growing season and consequently, precludes subsequent deficiencies as the crop approaches maturity. Slow release of nutrients also reduces luxury absorption by plants during the first flush of growth. Moreover, when coated fertilizers are employed in agronomic tests, experience has shown that there is a reduction or elimination of seedling damage which can be caused by contact between seedling roots and localized high concentrations of soluble fertilizer materials. As a general rule, the use of coated fertilizers reduces the probability of fertilizer injury to growing crops, such as grasses and legumes, when high application rates are used as top dressings.

The major disadvantages of coated fertilizers appear to be in the relatively high costs of most coating materials and in the difficulties inherent in manufacturing the product. Coating uniformity around each fertilizer particle often is difficult to obtain with large-scale production. Optical examination of most fertilizer particles usually shows a rough pitted surface with extruding crystals. Such granules have been extremely difficult to cover completely with coating materials. Since a very small imperfection in the coating allows the fertilizer to diffuse rapidly into the moist soil, relatively heavy coat weights are invariably required to insure uniform coatings around each fertilizer particle. Notwithstanding these problems, the published experimental data conclusively demonstrates that fertilizers can be successfully coated to retard the rate of nutrient release into the soil solution. In all probability, any widespread use of coated fertilizers in commercial farming operations will be largely dependent upon a reduction in the cost of the coating process.

Cost analyses of the agronomic tests conducted with the various types of coated fertilizers indicate that the further development of sulfur-coated fertilizers ultimately offers the best possibility of reducing the material cost of the coating process, since elemental sulfur is the least expensive fertilizer coating material per unit weight and fulfills the dual role of furnishing secondary plant-nutrient values to the soil. For this very practical reason, fertilizer technologists at the Tennessee Valley Authority have conducted an extensive research program into the development and field testing of sulfur-encapsulated fertilizers. Using sulfur coatings applied to urea prills as a molten spray, the technique of which is more fully described in U.S. Letters Pat. No. 3,295,950 granted Jan. 3, 1967 in the names of Glenn M. Blouin and Donald W. Rindt, these investigators demonstrated that sulfur coatings may be used to retard the nitrogen release rate. Agronomic tests made with sulfur-coated urea prills showed reduced toxicity at high application rates, extended availability of nitrogen, and reduced apparent gaseous losses of nitrogen with surface applications.

Molten elemental sulfur solidifies on the surface of a fertilizer pellet to form a semipermeable shell having a low impact strength. Experience has shown that unless the entire surface of the fertilizer substrate is completely covered with sulfur, the fertilizer substrate will dissolve within a few minutes upon immersion in water. Because molten elemental sulfur does not easily "wet" the surface of the common, readily available solid fertilizers, relatively heavy coat weights of sulfur are required to completely coat the fertilizer pellet with a suitable barrier coating for slow release. Although various compounds may be added to molten elemental sulfur to increase its impact strength, which additives inherently alter the rheological properties of molten sulfur, none of these additives appears to be capable of improving the ability of molten sulfur to wet the surface of the comomn, readily available fertilizer pellets.

SUMMARY OF THE INVENTION

During an exhaustive investigation into the use of molten sulfur to coat fertilizer pellets for slow release, it was found that certain finely divided powders, when dusted onto fertilizer pellets to form a subcoating, are unusually effective in reducing the contact angle between the surface of the underlying fertilizer pellet and molten sulfur but have no such effect when incorporated in the molten sulfur. By using a small amount of one of these finely divided powders as a subcoating immediately adjacent to and surrounding each fertilizer pellet, it is possible to produce sulfur-coated fertilizer pellets with slow release properties using much less sulfur than would be required to achieve comparable slow release properties absent the powder-subcoat. When used to precoat the fertilizer pellets prior to coating them with molten sulfur, these finely divided powders markedly enhance the agronomic properties of the resultant sulfur-coated fertilizers when compared to sulfur-coated fertilizers prepared under identical conditions but without the powder-subcoat. Further improvements in the agronomic properties of these powder-subcoated, sulfur-encapsulated fertilizers may be obtained by coating these products with a small amount of a hydrophobic sealant to form a surcoating substantially completely surrounding the sulfur coating, in which case even less sulfur is required to form an effective barrier coating around each of the fertilizer pellets. Proper use of the powder-subcoat has made it possible to consistently produce sulfur-encapsulated fertilizers which are adapted for use in soil to provide a controlled release of the fertilizer nutrients at a rate predetermined for the metabolic needs for a crop plant, and in which the aggregate weight of all of the coatings surrounding the fertilizer pellet need never exceed 16 percent by weight, based on the weight of the inner core fertilizer pellet, and in many instances may be appreciably less, particularly when a sealant surcoating is employed. Sulfur encapsulation of fertilizers using powder subcoating in accordance with the invention adds only a small increment to the costs of producing the fertilizer.

Based on these discoveries, the invention provides improved sulfur-encapsulated fertilizer pellets adapted for use in soil to provide a controlled dissolution of the fertilizer nutrients at a rate predetermined for the metabolic needs of a crop plant, each of which sulfur-encapsulated fertilizer pellets comprises (a) an inner core of a solid fertlizer pellet, (b) a subcoating immediately adjacent to and surrounding the inner core fertilizer pellet and comprising a finely divided powder capable of reducing the contact angle between the surface of the underlying fertilizer pellet and molten sulfur, and (c) a coating of elemental sulfur substantially completely encapsulating the powder-subcoated fertilizer pellet, the aggregate weight of all of the coatings applied to the fertilizer pellet not exceeding 16 percent by weight, based on the weight of the inner core fertilizer pellet.

THE BASIC PARAMETERS OF THE PROCESS

Basically, only two steps are required to produce these sulfur-encapsulated fertilizers, in the first of which a small amount of the finely divided powder is dusted onto the surface of solid fertilizer pellets so that it forms a powder subcoating immediately adjacent to and surrounding each fertilizer pellet, following which the powder-subcoated fertilizer pellets are then coated with a sufficient amount of molten sulfur to substantially completely encapsulate each powder-subcoated fertilizer pellet with a coating of elemental sulfur. If desired, a surcoating of a hydrophobic sealant may be applied over the sulfur coating, the major advantage of the sealant surcoating being that a lower coatweight of sulfur may be used to achieve the minimum acceptable slow release properties without a commensurate increase in the weight of the sealant surcoating applied.

The fertilizer pellets: By properly selecting and using the powder subcoating in accordance with the invention, sulfur encapsulation to provide controlled release of plant nutrients is feasible with any solid, water-soluble fertilizer material at only a small incremental increase in the manufacturing costs of the particular fertilizer. Among the commercial fertilizers which have been coated with sulfur for slow release using a powder subcoating are urea, diammonium phosphate, ammonium sulfate, 0–20–20 fertilizer, 5–20–20, fertilizer, 20–10–10 fertilizer, 20–20–20 fertilizer, 29–14–0 fertilizer, and 30–10–0 fertilizer, all of which fertilizers are readily available in various types of sized particles and are extensively used in commercial farming operations.

As used herein and unless otherwise identified, the term "fertilizer pellets" includes all solid, water-soluble fertilizer materials in the form of spheroids, prills, granules, pellets, and other types of sized particles, as well as mixtures of these particles. With respect to those fertilizers which are identified by number (such as the "XX–YY–ZZ fertilizer"), the numerical designation denotes the N–P–K content of the fertilizer material. Using this system of nomenclature, the first number (XX) designates the nitrogen content of the fertilizer which is expressed as percent N, the second number (YY) designates the phosphorus content of the fertilizer which is expressed as percent $P_2O$, and the third number (ZZ) designates the potassium content of the fertilizer which is expressed as percent $K_2O$. Although commercial fertilizer pellets are generally marketed in sizes ranging from 4 to 16 mesh (Tyler standard), usually with a fairly narrow particle size distribution (such as —4 +6 mesh, or —6 +12 mesh, or —8 +16 mesh), the most practical size for sulfur encapsulation for slow release appears to be —6 +12 mesh. For optimum results, the shape of the fertilizer pellet should be as nearly spherical as possible, since a spheroidized fertilizer has the lowest possible surface area per unit weight and requires much less sulfur (even with the powder subcoating) than an irregularly shaped fertilizer pellet having the same mesh size.

The powder subcoating: In the first step of the process, the fertilizer pellets are dusted with a small amount of a finely divided powder to form a powder subcoating immediately adjacent to and surrounding each fertilizer pellet, using a finely divided powder which is capable of reducing the contact angle between the surface of the underlying fertilizer pellet and molten sulfur. As a general rule, these finely divided powders should have a maximum average particle size of about 2.5μ and preferably should have an average particle size less than 1μ. Outstanding results have been consistently obtained with every type of fertilizer pellet using a powder subcoat comprising finely divided carbon black, which is nontoxic to plants and which is even effective as a powder subcoat when diluted with less expensive coal dust. Perhaps the best carbon black available for use in the powder subcoating is a carbon black having an average particle size of about 17 mμ and sold by Columbian Carbon Company under the trademark "Neotex 150." Other finely divided powders which are capable of reducing the contact angle between the surface of a fertilizer pellet and molten sulfur and which have been used to dust fertilizer pellets to form the powder subcoating include zinc borate, zinc carbonate, zinc chromate, zinc sulfide, lead borate, magnesium hydroxide, magnesium silicate, aluminum hydroxide, aluminum oxide, antimony pentaoxide, potassium sulfate, calcium fluoride, sodium tartrate, tin oxalate, thiourea, and verdigris. With some fertilizer pellets, the powder subcoating may be prepared by finely grinding some of the fertilizer and then dusting the fertilizer pellets with a small amount of this finely ground fertilizer material. On the basis of all available evidence, the finely divided powder appears to function by altering the physical surface of the fertilizer substrate rather than by undergoing any chemical reaction with either the fertilizer substrate or the molten sulfur during the coating operation. Consequently, selection of a suitable finely divided powder for use as a subcoating material should be limited to those finely divided powders which are not only capable of reducing the contact angle between the surface of solid fertilizer pellets and molten sulfur but which are chemically inert to the fertilizer substrate and to molten sulfur at least during the period required to coat the powder-subcoated fertilizer pellets with molten sulfur.

Whether or not a particular finely divided powder is suitable for use as a powder subcoating for a particular fertilizer prior to coating with molten sulfur appears to be a function of the roughness factor ($r$) of the finely divided powder, which is essentially a thermodynamically-derived property and which is defined by the formula $$r = \frac{\cos \theta_2}{\cos \theta_1}$$

where $\theta_1$ represents the contact angle between a drop of molten sulfur and the surface of an uncoated compressed disk of the fertilizer pellet, and $\theta_2$ represents the contact angle between a drop of molten sulfur and the surface of a compressed disk of the fertilizer pellet dusted with the finely divided powder subcoating. Because the roughness factor of a particular finely divided powder is based on the differential changes in the sulfur wettability of a particular fertilizer, a new standard test was devised to measure the contact angles $\theta_1$ and $\theta_2$, from which contact angle measurements the roughness factor of a particular finely divided powder may be computed with respect to a particular fertilizer.

The test procedure, which is termed the Thiokol Sulfur/Fertilizer Contact Angle Test, utilizes a reflective goniometer identical to that described in the article by Tomlinson Fort, Jr. and H. T. Patterson, Journal of Colloid Science, 18, 217–222 (1963), except that the platform of the goniometer is provided with a hot stage which is necessary to control the temperature at which the contact angles are measured. Compressed disks of the particular fertilizer under study are prepared by crushing the fertilizer pellets using mortar and pestle, placing 0.5 gram of the crushed fertilizer pellets in a 14 mm. diameter mold in a Carver Laboratory Press, and then compressing the crushed fertilizer pellets at a pressure of 10,000 p.s.i. The compressed disks should be stored in a desiccator unless used immediately. The powder-subcoated compressed disk (on which the contact angle $\theta_2$ will be measured) is prepared by attaching one of the compressed disks to the inside of a 1 oz. jar, to which is then added 10 grams of the fertilizer pellets and 1 gram of the particular finely divided powder to be studied. The jar is then mounted on a roller and rolled for 1 hour at 300 r.p.m., after which the powder-subcoated compressed disk is removed. To measure the contact angles between a drop of molten sulfur and the respective surfaces of the uncoated compressed disk (for which measurement the contact angle is termed $\theta_1$) and powder-subcoated compressed disk (for which measurement the contact angle is termed $\theta_2$), the disk is placed on the hot stage on the goniometer platform and held for 5 minutes at a temperature of 160°±5° C., after which a drop of molten sulfur (140°±5° C.) is placed on the surface of the disk using a preheated medicine dropper. The system is allowed to equilibrate for 2 minutes, and the contact angle is then measured by the same technique described in the article by Tomlinson Fort, Jr. and H. T. Patterson, Journal of Colloid Science, 18, 217–222 (1963). The roughness factor of the finely divided powder with respect to the fertilizer substrate may be computed from the cosines of the contact angles $\theta_1$ and $\theta_2$.

Although the formula which defines the roughness factor is theoretically correct and may be derived thermodynamically from the Young equation, accurate measurement of the contact angles from which the roughness factor is computed can only be made on flat surfaces which is the basis for using the surface of a compressed disk of the fertilizer pellet as the substrate in the Thiokol Sulfur/Fertilizer Contact Angle Test. Because the surface of a compressed disk of the fertilizer pellet cannot be used to simulate the actual surface of the fertilizer pellet to be coated with molten sulfur, the Thiokol Sulfur/Fertilizer Contact Angle Test cannot be used to measure the actual contact angle between a drop of molten sulfur and the surface of the fertilizer pellet. Consequently, the roughness factor of a particular finely divided powder with respect to a particular fertilizer material should only be used as an indicium of whether or not that powder is capable of reducing the contact angle between the surface of the fertilizer pellets and molten sulfur and therefore is suitable for use as a powder subcoating prior to coating with molten sulfur. As an indicium, however, the roughness factor of the powder has proven to be remarkably accurate for predicting the suitability of a finely divided powder as a subcoating for the fertilizer pellets. On the basis of all of the available evidence, when the roughness factor of the powder is in the range from 1.1 to about 5, the generally that powder will make a suitable subcoating for the particular fertilizer for which the roughness factor of the powder was computed.

Only a small amount of the finely divided powder is required to form the subcoating immediately adjacent to and surrounding the fertilizer, the amount being dependent upon the mesh size of the fertilizer pellets and the average particle size of the powder. In general, the weight of the subcoating should be in the range from about 0.2 to about 3 percent by weight, based on the weight of the uncoated fertilizer pellets. When carbon black (such as Neotex 150) is used to form the powder subcoating prior to coating the fertilizer pellets with sulfur, the weight of the subcoating should be in the range from about 0.3 to about 2 percent by weight, based on the weight of the uncoated fertilizer pellets.

The sulfur coating: In the second step of the process, the powder-subcoated fertilizer pellets are coated with molten elemental sulfur to substantially encapsulate each powder-subcoated fertilizer pellet with a coating of elemental sulfur. Because molten elemental sulfur solidifies on the surface of a fertilizer pellet to form a semipermeable shell having low impact strength which frequently results in the appearance of cracks in the sulfur jacket, various compounds may be added to the molten elemental sulfur to increase its impact strength upon cooling. The most effective additives for this purpose are the polysulfide polymers, which are organic polymers containing disulfide linkages (—SS—) or polysulfide linkages (—$S_x$—, where $x > 2$) in the polymer molecule. These polysulfide polymers function as plasticizers for molten sulfur and reduce the degree of crystallinity in the solidified sulfur. Several excellent inexpensive polysulfide polymers are available for this purpose, including the interpolymers of sulfur with styrene, bis(2-chloroethyl) formal, dicyclopentadiene, and ethyl hexyl acrylate. As a general rule, no more than an aggregate of about 10 percent by weight of additives should be employed in the molten elemental sulfur, since the coating costs become prohibitive and the advantages of using sulfur as a coating material become nugatory. As used herein, therefore, the term "molten elemental sulfur" includes not only molten elemental sulfur but molten sulfur containing up to about 10 percent by weight of various additives, such as polysulfide polymers.

The weight of the sulfur coating applied to the powder-subcoated fertilizer pellets should be in the range from about 5 to about 14 percent by weight, based on the weight of the uncoated fertilizer pellets. The amount of molten elemental sulfur required to form a coating substantially completely encapsulating each powder-subcoated fertilizer pellet is dependent upon several factors including the shape and surface area of the fertilizer pellets, the plasticity of the molten elemental sulfur, and the type of powder subcoating used to dust the fertilizer pellets. As a general rule the weight of the sulfur coating should be in higher ranges (from about 10 to about 14 percent by weight) when no sealant surcoating is employed and may be in the lower ranges (from about 5 to about 10 percent by weight) when a hydrophobic sealant is used as a surcoating, all percentages being based on the weight of the uncoated fertilizer pellets.

The surcoating: Further improvements in the agronomic properties of the powder-subcoated, sulfur-encapsulated fertilizer pellets may be obtained by coating these products with a small amount of a hydrophobic sealant which forms a surcoating substantially completely surrounding the sulfur coating of each pellet. These hydrophobic sealant compounds are normally solid or semisolid materials which are capable of forming a substantially water-impervious barrier layer when applied as a surcoating to each pellet. Moreover, the hydrophobic sealant compounds must be thermally stable at ambient temperatures and not attacked by dry soil, after which the most important criterion is that the sealant must be inexpensive. To facilitate the application of the sealant outercoat, the sealant surcoating should be applied in the form of a liquid, preferably having a sufficiently low viscosity so that a very thin surcoating may be used, which solidifies as a solid or semisolid surcoating upon cooling or forms a solid or permisolid surcoating upon curing. Although many types of hydrophobic sealants may be used to form the surcoating, the most effective yet inexpensive materials have been found to be the petroleum-derived soft waxes and oils. Other suitable hydrophobic sealants include petrolatums and paraffins as well as a number of synthetic polymers, such as polyethylene, polypropylene, or polyvinyl acetate. Alternatively, the sealant surcoating may be formed by using resin systems which undergo curing by cross-linking to form a solid or semisolid, water-impervious barrier layer around each of the powder-subcoated, sulfur-encapsulated fertilizer pellets.

Only very small amounts of sealant are required to form the surcoating, the weight of which should be in the range from about 0.1 to about 5 percent by weight, based on the weight of the uncoated fertilizer pellets. By way of illustration, when the fertilizer pellets are subcoated with from 0.2 to 3 percent by weight of carbon black and then coated with from 5 to 10 percent by weight of elemental sulfur, excellent results have been obtained by using from 0.5 to 2 percent by weight of a soft wax as the surcoating, all percentages being based on the weight of the uncoated fertilizer pellets. When the sealant surcoating is employed, generally it is possible to obtain the desired controlled dissolution properties using an aggregate coatings weight (subcoating, sulfur coating, and sealant coating) equal to 10 percent by weight or even less, based on the weight of the uncoated fertilizer pellets.

Process equipment and conditions: Applying the various coatings to the fertilizer pellets in accordance with the process of the invention may be carried out in batch or continuous equipment. Perhaps the simplest technique for both batch and continuous operations is based on using one or more rotary drums, into which the various coating materials are sequentially introduced while rotating a bed of the fertilizer pellets. With this type of equipment, the best results have been obtained by heating the bed of fertilizer pellets to a temperature in the range from about 80° C. to about 120° C. and by applying the molten elemental sulfur to the powder-subcoated fertilizer pellets as an atomized spray. Neither the application of the powder subcoating nor the application of the sealant surcoating present any particular problems, but the handling of molten elemental sulfur to obtain maximum coating efficiency requires careful study prior to scale-up. Variables which appear to significantly influence the sulfur coating efficiency and which should be considered when designing any plant facility using rotary drum equipment for sulfur encapsulation include the temperature of the molten elemental sulfur prior to atomization, the temperature of the atomizing gas which forces the molten sulfur through the spray head, the temperature of the rotating bed of fertilizer pellets, the particle size of the atomized sulfur, and the speed of the rotary drum during sulfur encapsulation of the powder-subcoated fertilizer pellets.

Ultimately, the most efficient and economic method for producing the sulfur-encapsulated fertilizer pellets of the invention may be based on the use of fluid bed techniques, in which a fluidized bed of the fertilizer pellets will pass through zones in which the powder subcoating, the sulfur coating, and the sealant surcoating will be sequentially applied to the fluidized pellets, since such fluid bed techniques may permit low-cost handling of large amounts of material.

Product standards: Two criteria are indicative of whether a particular sulfur-encapsulated fertilizer may be capable of slowly releasing its plant nutrients in the soil, namely (1) the initial dissolution rate, which is a measure of the total amount of the fertilizer which dissolves over the first 24-hour period when the sulfur-encapsulated fertilizer is immersed in water at ambient temperatures and which, in turn, may be regarded as an indication of the ability of the coated fertilizer to withstand depletion of nutrients through leaching, and (2) the long-term dissolution rate, which is a measure of the rate per day at which the sulfur-encapsulated fertilizer releases its plant nutrients over a long-term period (generally 7 weeks) when the coated fertilizer is immersed in water at ambient temperatures for that period. The long-term dissolution rate is sometimes expressed in terms of the aggregate or cumulative percentage of fertilizer released over long-term periods, in which case it must be considered in conjunction with the initial dissolution rate to properly evaluate the properties of the coated fertilizer. To meet the minimum acceptable product standards, a sulfur-coated fertilizer must have an initial (24-hour) dissolution rate not greater than 50 percent and a cumulative 7-week dissolution rate not greater than 80 percent. The most practical sulfur-coated fertilizer for general use should have a 24-hour dissolution rate not greater than 20 percent and a cumulative 7-week dissolution rate not greater than 65 percent.

The effect of the powder subcoating on dissolution rates

The effect of interposing a powder subcoating between the inner core fertilizer pellet and the sulfur coating in accordance with the invention is discussed in some detail below with particular reference to FIGS. 1 to 3 of the accompanying drawings, which illustrate charts comparing the dissolution rates (initial or long-term) of particular sulfur-encapsulated fertilizers.

To illustrate the effect on the 24-hour dissolution rate when fertilizer pellets are precoated with powder and then coated with varying amounts of sulfur, spheroidized urea (−6 +10 mesh) was precoated with 0.5 p.p.h. (the abbreviation "p.p.h." is used herein to denote parts per hundred parts of the fertilizer) of carbon black (Neotex 150), after which the powder-subcoated urea was subdivided into three aliquot portions which were then respectively spray coated with 5, 7 and 10 p.p.h. of molten elemental sulfur containing 5 percent by weight of polysulfide plasticizer (ZM–511). Each of the three series of sulfur-encapsulated urea products was then coated with a varying amount of soft wax, ranging from 0.27 to 1.33 p.p.h., to form a sealant surcoating. The 24-hour dissolution rates for each product in these three series of sulfur-encapsulated urea products are summarized in Table I and graphically depicted in FIG. 1 of the accompanying drawings.

TABLE I.—INITIAL DISSOLUTION RATES OF SULFUR ENCAPSULATED SPHEROIDIZED UREA CONTAINING 0.5 P.P.H. OF CARBON BLACK SUBCOATING AND VARYING AMOUNTS OF SOFT WAX SURCOATING

[Percent]

| Sulfur coat weight | Soft wax surcoating | 24-hour dissolution |
|---|---|---|
| 5 | 0 | 78 |
|   | 0.64 | 25 |
|   | 1.17 | 12 |
|   | 1.28 | 9 |
| 7 | 0 | 69 |
|   | 1.09 | 7 |
|   | 1.33 | 5 |
| 10 | 0 | 27 |
|   | 0.27 | 13 |
|   | 0.45 | 7 |

The data summarized in Table I has been plotted in the three curves shown in FIG. 1 of the accompanying drawings, each of which curves graphically depicts the relationship between the 24-hour dissolution rate of a series of sulfur-encapsulated spheroidized urea products (each product in each series having been subcoated with 0.5 p.p.h. of carbon black) and the amount of soft wax surcoating on the products in that series. As shown in FIG. 1, curve A represents all of the products in the series which contained 10 percent by weight of the sulfur coating, curve B represents all of the products in the series which contained 7 percent by weight of the sulfur coating, and curve C represents all of the products in the series which contained 5 percent by weight of the sulfur coating. Analysis of this data illustrates the general rule that when the weight of the sulfur coating is decreased from 10 to 5 percent by weight, the amount of the surcoating must be increased only slightly but not commensurately to maintain a low initial dissolution rate.

Nowhere is the effect of interposing the powder subcoating between the fertilizer pellet and the sulfur coating more convincingly demonstrated than in the comparison of the slow release properties of sulfur-encapsulated fertilizers prepared with a nominal 6 p.p.h. of sulfur, both with and without the powder subcoating. When two series of spheroidized urea are coated with a nominal 6 p.p.h. of molten elemental sulfur under identical reaction conditions, the sole difference being that one series has been precoated with a finely divided powder in accordance with the invention, only the powder-subcoated products possesses slow release properties even though both series are coated with varying amounts of hydrophobic sealant. The chart shown in FIG. 2 of the accompanying drawings illustrates the comparison in the initial dissolution rates of two series of sulfur-encapsulated spheroidized urea products, each of which had been spray coated with 6 p.p.h. of molten elemental sulfur and subsequently coated with varying amounts of soft wax, the only difference being that one series (depicted by curve A of FIG. 2) had been precoated with 1.9 p.p.h. of a finely divided powder mixture composed of 20 parts by weight of carbon black (Neotex 150) and 80 parts by weight of a finely ground coal dust (Carb-O-Fil) while the other series (depicted by curve B in FIG. 2) did not contain the powder subcoating. All of the products depicted by curve A of FIG. 2 were free flowing, which is an important characteristic when coated fertilizers are handled in conventional commerical equipment. The majority of the products depicted in curve B of FIG. 2 do not have acceptable handling characteristics. Analysis of the data shown in FIG. 2 of the accompanying drawings demonstrates that only those sulfur-encapsulated urea products which contained the powder subcoating possessed suitable slow release properties.

The ultimate test of the effectiveness of a sulfur-encapsulated fertilizer depends upon whether the product is capable of releasing the plant nutrients in soil at a rate predetermined for the metabolic needs of a growing plant. Although the actual rate of release is a function of soil moisture and should be measured in soil columns, experience has shown that there is a reproducible correlation between the release rate in solid columns and the elution of the fertilizer when the sulfur-encapsulated fertilizer is immersed in water over an extended period of time. Extended dissolution tests may be used as an accurate indication of the rate at which sulfur-encapsulated fertilizers will release plant nutrients in soil. The dissolution of nitrogen-containing fertilizers may be conveniently followed by measuring the change in concentration of the fertilizer solution, either by chemical methods or by simply measuring changes in electrical conductivity. Chemical analyses of the fertilizer solution is the most efficient technique for urea, while the conductivity technique may be conveniently used for ammonium type fertilizers.

FIG. 3 of the accompanying drawings shows the cumulative nitrogen release rates for a series of sulfur-encapsulated urea products which were immersed in water for a 7-week period. The curves shown in FIG. 3 of the accompanying drawings and the products to which they relate are as follows:

Curve A of FIG. 3 represents the theoretically ideal nitrogen release rate of urea which is defined as 1 percent per day after an initial 15 percent release;

Curve B of FIG. 3 represents the cumulative nitrogen release rate for a sulfur-encapsulated spheroidized urea product which was prepared by sequentially (i) dusting spheroidized urea (−6 +12 mesh) with 1.9 p.p.h. of a finely divided powder mixture consisting of 20 parts by weight of carbon black (Neotex 150) and 80 parts by weight of finely ground coal dust (Carb-O-Fil, —325 mesh), (ii) spray coating the powder-subcoated spheroidized urea with 12.8 p.p.h. of molten elemental sulfur containing 5 percent by weight of a polysulfide plasticizer (ZM–511), and (iii) coating the powder subcoated sulfur-encapsulated spheroidized urea with 0.2 p.p.h. of a soft wax;

Curve C of FIG. 3 represents the cumulative nitrogen release rate of a sulfur-encapsulated spheroidized urea product which was prepared by sequentially (i) dusting spheroidized urea (—6 +12 mesh) with 1.8 p.p.h. of a finely divided powder mixture consisting of 20 parts by weight of carbon black and 80 parts by weight of finely ground coal dust (ii) spray coating the powder-subcoated spheroidized urea with 13.1 p.p.h. of molten elemental sulfur which did not contain any plasticizer, and (iii) coating the powder-subcoated, sulfur encapsulated spheroidized urea with 0.6 p.p.h. of a soft wax;

Curve D of FIG. 3 represents the cumulative nitrogen release rate of a sulfur-encapsulated granular urea product which was furnished by the Tennessee Valley Authority and which had been produced in accordance with U.S. Letters Patent No. 3,295,950. This product, which contained about 40 p.p.h. of a sulfur coating and about 1.6 p.p.h. of a soft wax outercoat but which did not contain any powder subcoating, was employed in the extended dissolution tests as a basis for comparison with the products of the invention;

Curve E of FIG. 3 represents the cumulative nitrogen release rate of a sulfur-encapsulated spheroidized urea product which contained a powder subcoating but did not contain any outercoat sealant. This product was prepared by sequentially (i) dusting spheroidized urea with 1.8 p.p.h. of a finely divided powder consisting of 20 parts by weight of carbon black and 80 parts by weight of finely ground coal dust, and (ii) spray coating the powder-subcoated spheroidized urea with 13.1 p.p.h. of molten elemental sulfur which did not contain any plasticizer; and Curve F of FIG. 3 represents the cumulative nitrogen release rate of a sulfur-encapsulated spheroidized urea product which also contained a powder subcoating but did not contain the outercoat sealant. This product was prepared by sequentially (i) dusting spheroidized urea (—6 +12 mesh) with 0.7 p.p.h. of carbon black, and (ii) spray coating the powder-subcoated spheroidized urea with 13.7 p.p.h. of molten elemental sulfur containing 5 percent by weight of a polysulfide plasticizer (ZM–511).

In theory, the ideal nitrogen release rate is 1 percent per day after an initial 15 percent release, which ideal release rate has been plotted as curve A in FIG. 3 of the accompanying drawings. Because different crops have different nitrogen demand curves over their growing cycle, the theoretically ideal nitrogen release rate should be regarded as the average nitrogen requirement for growing plants rather than as the nitrogen demand curve for a specific plant. Analysis of the extended dissolution tests summarized in FIG. 3 shows that the sulfur-encapsulated urea products of the invention can be "tailored" so that their release rate curves most nearly approach the theoretically ideal nitrogen release rate. Agronomic tests using these products as fertilizers to promote the growth of Alta Fescue grass have demonstrated their effectiveness in soil to provide a controlled dissolution of the plant nutrients at rates which most nearly approximated the nitrogen demand curve for this plant.

Use of contact angle measurements

The roughness value of carbon black having an average particle size of about 17 m$\mu$ (Neotex 150) was computed with respect to urea and 20–10–10 fertilizer, measuring the contact angles by the Thiokol Sulfur/Fertilizer Contact Angle Test. The results of these contact angle measurements are summarized below in Table II.

TABLE II

Contact angle measurements

| Substrate: | Contact angle |
|---|---|
| Urea | 62° |
| Urea/carbon black | 37° |
| 20–10–10 fertilizer | 81° |
| 20–10–10 fertilizer/carbon black | 43° |

The roughness factor of carbon black was computed to be 1.7 with respect to urea and to be 4.7 with respect to the 20–10–10 fertilizer. When 10 percent by weight of carbon black was incorporated in the molten sulfur, the contact angle between the surface of a compressed disk of uncoated urea and a drop of the molten sulfur containing the 10 percent of carbon black was found to be 72°, which was actually higher than the contact angle (62°) between the surface of the compressed disk of uncoated urea and a drop of molten sulfur. This test shows that the inclusion of the carbon black in the sulfur actually impairs the wettability of sulfur.

EXAMPLES

The following examples are illustrative of the many types of commercially available fertilizers which can be coated with sulfur in accordance with the invention to provide controlled dissolution of the plant nutrients. Unless otherwise indicated in each of these examples, the fertilizer was coated in a rotary pan which was operated at a drum speed of 65 to 85 r.p.m. throughout the various coating operations. Thermocouples were mounted in the rotary pan to measure the fertilizer bed temperature prior to coating with sulfur. As a matter of convenience, the powder subcoating was applied in a rotating one gallon jar. The jar, which contained the powder subcoating and the fertilizer pellets, was placed on a jar roller for 15 to 60 minutes. In some instances, an excess amount of the powder was added and screened out prior to applying the molten elemental sulfur. A portion of the powder-subcoated fertilizer was then charged to the rotary pan, after which the molten elemental sulfur was sprayed under pressure onto the rotating fertilizer bed, using a hand-operated spray gun which could be controlled to accurately monitor the amount of sulfur atomized onto the rotating fertilizer bed. To avoid oxidation, the molten sulfur was pressurized under nitrogen gas. After the molten sulfur had coated the individual pellets in the rotating fertilizer bed, the temperature of the bed dropped to a point below the solidification point of sulfur, after which the soft wax was added to the rotating bed.

Example 1

Sixteen hundred grams of spheroidized urea having a —6 +10 mesh size and produced by Consolidated Mining and Smelting Company and 8 grams of carbon black (Neotex 150) were charged to a one gallon jar which was placed on a standard jar roller for about 30 minutes. A fifty gram portion of the precoated fertilizer was charged to a small rotary pan. The temperature of the powder-rotating fertilizer bed was adjusted to 95° C., at which point about 3 grams of molten elemental sulfur containing 5 percent by weight of a polysulfide plasticizer (ZM–511) were sprayed through a pressurized spray gun onto the rotating fertilizer bed. When the bed temperature had dropped to 90° C., about 0.6 gram of a soft wax ("Gulf Bright Star") were added to the rotating fertilizer bed. Analysis of a sample of the product showed it to be characterized by a sulfur coating equal to 5 percent by weight, and a soft wax surcoating equal to 1.17 percent by weight, both percentages being based on the weight of the urea. The 24 hour dissolution rate of this product was 12 percent.

Example 2

Sixteen hundred grams of spheroidized urea having a —6 +12 mesh size and produced by Consolidated Mining and Smelting Company and 64 grams of an intimately mixed powder consisting of 20 parts by weight of carbon black (Neotex 150) and 80 parts by weight of finely ground (−325 mesh) coal dust (Carb-O-Fil) were charged to a one gallon jar. The jar was rolled on a standard jar roller for about 30 minutes. The excess mixed powder was screened out. The fertilizer was precoated with 1.9 p.p.h. of the mixed powder. One and one-half pounds (681 grams) of the precoated fertilizer were then charged to a rotary pan. After adjusting the temperature of the rotating bed to 95° C., about 82 grams of molten elemental sulfur containing 5 percent by weight of a polysulfide plasticizer (ZM–511) were sprayed onto the rotating bed at a rate of about 17 grams per minute, during which the pot temperature of the molten sulfur was in the range from 135° C. to 140° C. After all of the sulfur had been sprayed onto the rotating fertilizer bed, about 1.4 grams of soft wax were added to the rotating fertilizer bed to form a surcoating around each pellet. This product has an extended dissolution rate identical to that depicted by curve B of FIG. 3 of the accompanying drawings. Its initial dissolution rate was 6.4 percent.

Example 3

Urea prills, manufactured by Sun Olin Chemical Company and screened to a mesh size of −8 +10, were precoated with 2.1 p.p.h. of carbon black diluted with finely ground coal dust (20/80 ratio). After the bed temperature had been adjusted to 95° C., the powder-precoated urea prills were then coated with molten elemental sulfur using 12.7 p.p.h. of sulfur. The powder-subcoated, sulfur-encapsulated urea prills were then transferred to another coating pan (operated at 65 r.p.m.), and the bed temperature was adjusted to 80° C., at which temperature the powder subcoated sulfur-encapsulated prills were coated with 1.13 p.p.h. of a soft wax. The product was free-flowing and gave a 24-hour dissolution rate of 20 percent.

Example 4

Urea prills (−6 +12 mesh) produced by the Netherlands State Mines were precoated with 1.16 p.p.h. of carbon black diluted with finely ground coal dust (20/80 ratio). The drum temperature was adjusted to 95–97° C., at which temperature the powder-precoated urea prills were coated with molten elemental sulfur (pot temperature=136° C.) using 11.0 p.p.h. of sulfur. An aliquot portion of the powder-subcoated, sulfur-encapsulated prills was coated with 0.92 p.p.h. of a soft wax, using a bed temperature of 80° C. during this final coating operation. The 24-hour dissolution rate of the sealant surcoated product was 18 percent.

Example 5

Fifty grams of 29–14–0 fertilizer having a −6 +12 mesh size and manufactured by Armour Agricultural Chemical Company were precoated with 0.5 p.p.h. of carbon black (Neotex 150) and then coated with 6 p.p.h. of molten sulfur containing 5 percent by weight of a polysulfide plasticizer (ZM–511). After the sulfur coating had been applied, the fertilizer pellets were coated with 2.5 p.p.h. of a soft wax. Upon analysis, the product was found to contain 0.46 p.p.h. of carbon black, 5.67 p.p.h of sulfur, and 2.34 p.p.m. of wax; the 24-hour dissolution rate was 4 percent.

Example 6

Fifty grams of 20–10–10 fertilizer (−6 +12 mesh) produced by the Ortho Division of California Chemical Company was precoated with 0.5 p.p.h. of carbon black, then coated with 7 p.p.h. of molten sulfur, and finally coated with 1.6 p.p.h. of a soft wax. The product had excellent slow release properties.

Example 7

Diammonium phosphate (18–46–0 fertilizer) produced by W. R. Grace & Company was precoated with 2.0 p.p.h. of carbon black/coal dust (20/80 ratio), and then coated with 13.2 p.p.h. of sulfur. The 24-hour dissolution rate was 30 percent.

AGRONOMIC TESTS

The use of the sulfur-encapsulated fertilizers of the invention to provide controlled dissolution of the plant nutrients is demonstrated by the following series of comparative agronomic tests, in each of which a particular plant was grown under carefully controlled conditions.

Fescue grass: The physiology of Alta Fescue grass is such that the growing plant quickly responds to nitrogen availability, the rate of which response may be correlated to the rate at which nitrogen from fertilizer is released into soil containing the growing plant. Utilizing this physiological characteristic of Alta Fescue grass, a sensitive agronomic test has been devised as a quantitative measure of the efficiency in soil of slow release nitrogen fertilizers. This test, which is known as the Fescue Grass Growth Test, is based on measuring the rate at which nitrogen-tarved Alta Fescue grass plants resume their growth when fertilized with the particular slow release fertilizer under study. As a basis for comparison, this rate of resumed growth is compared to the rate at which similar nitrogen-starved Alta Fescue grass plants respond to a daily feed of an aqueous solution of the nitrogen fertilizer under conditions which are known to yield optimum growth. The rate of resumed growth of those plants fertilized with the slow release fertilizer, when compared to the optimum standard, is a sensitive agronomic indicium of the ability of the slow release fertilizer to provide controlled release of its plant nutrients in soil.

To prepare the growing plants required for the Fescue Grass Growth Test, a series of 1450-ml. beakers (4.5-inch diameter) each containing the same amount of Yolo loam soil is seeded with Alta Fescue grass seed and fertilized with an aqueous solution of the particular nitrogen fertilizer (e.g., urea) whose slow release derivative is to be studied. The aqueous solution of the uncoated nitrogen fertilizer is added to each beaker on a daily basis, using a daily level of fertilizer which corresponds to the nitrogen requirements of the plant. At this daily level of fertilizer, the plants soon reach an optimum growth rate. After a good growth of grass has been established in each beaker, the daily addition of fertilizer solution is halted and the plant growth is deliberately stunted by withholding the nitrogen fertilizer. The plant response to this deliberately induce nitrogen starvation is very rapid, and within several days the rate of growth of each plant can be visually observed to diminish markedly. Those nitrogen-starved plants whose rate of growth has been diminished such that their growth rate is only 25 percent of optimum are then selected for use in the Fescue Grass Growth Test.

The nitrogen-starved plants selected for the Fescue Grass Growth Test are separated equally into three groups, the first group (Group A) of which is to be fertilized with an aqueous solution of the uncoated fertilizer at a daily level corresponding to the nitrogen requirements of the plant; the second group (Group B) is to be fertilized with the slow release fertilizer being studied, adding all the fertilizer required by the plant at the inception of the test; and the third group (Group C) is to receive no fertilizer so that the results of continued nitrogen starvation can be used as a basis for comparison. At the inception of the test, a grass plug (½-inch diameter and 3-inches deep) is gently removed from each plant in Group B and the loose soil from the bottom of each plug is then mixed with the particular slow release fertilizer under study, using the total amount of fertilizer which that plant will require over its growth cycle. The soil containing the slow release fertilizer is then placed in the bottom of the hole of the particular plant in Group B from which the plug was removed and the grass plug from that is then replaced.

The Fescue Grass Growth Test is conducted over a period of 9 weeks, during which each plant in Group A receives a daily feed of the aqueous fertilizer solution of the uncoated nitrogen fertilizer (the daily feed being based on the nitrogen requirement of Alta Fescue grass to maintain the optimum growth rate of this plant), while each plant in Group B (which had been fertilized at the beginning of the test with an amount of slow release fertilizer equal to the total amount of nitrogen required by the plant over the test cycle) and in Group C (to which no fertilizer is added) receive only the same daily amount of water over the test period. The plants in Group A readily respond to the daily feed of fertilizer solution, all of which is in the form of available nitrogen, and resume their growth at the optimum rate. The plants in Group B also readily respond to the available nitrogen in the soil, which is a function of the rate at which the slow release fertilizer releases the plant nutrients in the soil. If the fertilizer is released too rapidly to the plants in Group B, the plant roots undergo damage because of localized high concentration of fertilizer and the growth is stunted. The plants in Group C continue to undergo diminished growth because of nitrogen starvation. At the end of each week during the test period, the grass in each plant is cut to a uniform height, the grass cuttings are dried in an oven at 65° C. for 24 hours, and the dried grass cuttings are weighed. The average weight of dried grass cuttings in each group is recorded and cumulatively plotted as a function of time.

The Fescue Grass Growth Test was used to evaluate the ability of the sulphur-encapsulated fertilizers of the invention to provide controlled dissolution of plant nutrients in soil. The particular sulfur-encapsulated fertilizer used in this agronomic test was prepared as described in Example 2. Following the standard procedure for the Fescue Grass Growth Test described above, the plants required for the test were fertilized with an aqueous solution of urea. After a good growth of grass had been established, the daily addition of fertilizer solution was halted, the plant growth was deliberately stunted by withholding the nitrogen fertilizer, and those nitrogen-starved plants whose rate of growth had been diminished such that their growth rate was only 25 percent of optimum were then selected for use in the Fescue Grass Growth Test. These plants were divided into three groups which were designated as Group A, Group B and Group C, respectively. The nitrogen-starved plants in Group A received a daily feed of the aqueous solution of urea at a daily level known to yield optimum growth. The nitrogen-starved plants in Group B were fertilized at the beginning of the test with the sulfur-encapsulated spheroidized urea described above, using 300 mg. of nitrogen per grass plug. The nitrogen-starved plants in Group C received no further nitrogen. At the end of each week during the test period, the grass in each plant was cut to uniform height, the grass cuttings were dried in an oven at 65° C. for 24 hours, and the dried grass cuttings were weighed. The average weight of dried grass cuttings in each group was cumulatively plotted as a function of time. At the end of the test period, the plants in Groups A and B were observed to have excellent color, while the plants in Group C were characterized by a yellow color.

The results of these tests are summarized in the curves shown in FIG. 4 of the accompanying drawings, in which curve A represents the cumulative average growth of the plants in Group A (which is the theoretically ideal growth rate), curve B represents the cumulative average growth of the plants in Group B, and curve C depicts the cumulative average growth of the plants in Group C. Analysis of this data demonstrates that the foregoing sulfur-encapsulated spheroidized urea product of the invention is capable of releasing the plant nutrients at a rate substantially corresponding to the daily level of nitrogen which is known to yield optimum growth in Alta Fescue grass.

Chrysanthemums: Sulfur-encapsulated 20–10–10 fertilizer pellets, each containing an average of 0.75 p.p.h. of a carbon black subcoating and 12.2 p.p.h. of a coating consisting of 94 percent by weight of elemental sulfur, 5 percent by weight of a polysulfide plasticizer (ZM–511), and 1 percent by weight of fatty acids (Veg Acid) coating but without any outercoat sealant, were evaluated as a slow release fertilizer for chrysanthemums in a test in which the plants were handled about the way commercial growers would produce potted mums. The plants used in this test were "Golden Princess Ann" chrysanthemums which were planted as root cuttings in four 6-inch pans, using 5 plants per pan. The soil used in each pan was a mixture of equal volumes of fine sand and peat, to which soil mixture had been added 1 gram of dolomitic limestone per pan. Prior to planting, the soil in one pan (Pan A) was fertilized with the sulfur-encapsulated 20–10–10 fertilizer pellets and the soil in another pan (Pan B) was fertilized with uncoated ureaformaldehyde fertilizer which is a commonly used slow release fertilizer. Of the two remaining pans, one (Pan C) received a solution of nitrogen fertilizer on a daily basis, while the remaining pan (Pan D) received no nitrogen fertilizer. After planting, the plants in each pan received light for a period of 1 week as well as a daily irrigation of water. After 2 weeks, the plants were visually rated in accordance with the following rating scale:

1=Excellent quality
2=Good quality
3=Substandard but saleable quality
4=Poor quality Reproducible differences in the range from 0.3 to 0.5 on this rating scale are possible. The results of these tests are summarized below in Table III.

TABLE III.—COMPARATIVE AGRONOMIC TESTS WITH "GOLDEN PRINCESS ANN" CHRYSANTHEMUMS

| Pan No.: | Nitrogen fertilizer | Grams of nitrogen per pan | Rating |
|---|---|---|---|
| A | Sulfur-encapsulated 20-10-10 fertilizer | 4 | 1.2 |
| B | Urea-formaldehyde | 4 | 1.5 |
| C | Liquid nitrogen | | 1.8 |
| D | none | | 4.0 |

The results of these agronomic tests demonstrate that sulfur-encapsulated 20–10–10 fertilizer produced in accordance with the invention is a superior slow release fertilizer for "Golden Princess Ann" chrysanthemums.

I claim:

1. Sulfur-encapsulated fertilizer pellets adapted for use in soil to provide a controlled dissolution of the fertilizer nutrients at a rate predetermined for the metabolic needs of a crop plant, each of which sulfur-encapsulated fertilizer pellets comprises (a) an inner core of a solid fertilizer pellet, (b) a subcoating immediately adjacent to and surrounding the inner core fertilizer pellet and comprising a finely divided powder having a maximum average particle size of about $2.5\mu$ and capable of reducing the contact angle between the surface of the underlying fertilizer pellet and molten sulfur, and (c) a coating of elemental sulfur substantially completely encapsulating the powder-subcoated fertilizer pellet, the aggregate weight of all of the coatings surrounding the fertilizer pellet not exceeding 16 percent by weight, based on the weight of the inner core fertilizer pellet.

2. Sulfur-encapsulated fertilizer pellets according to claim 1, in which the finely divided powder used in the subcoating has an average particle size less than 1 micron.

3. Sulfur-encapsulated fertilizer pellets according to claim 1, in which the finely divided powder used in the subcoating is characterized by a roughness factor not less than 1.1 when computed in accordance with the following formula $$r = \frac{\cos \theta_2}{\cos \theta_1}$$

where $r$ represents the roughness factor, $\theta_1$ represents the contact angle between a drop of molten sulfur and the surface of an uncoated compressed disc of the fertilizer pellet, and $\theta_2$ represents the contact angle between a drop of molten sulfur and the surface of a compressed disc of the fertilizer pellet dusted with the finely divided powder subcoating, all contact angles being determined by the Thiokol Sulfur/Fertilizer Contact Angle Test.

4. Sulfur-encapsulated fertilizer pellets according to claim 1, in which the finely divided powder used in the subcoating is characterized by a roughness factor in the range from 1.1 to about 5 when computed in accordance with the following formula $$r = \frac{\cos \theta_2}{\cos \theta_1}$$

where $r$ represents the roughness factor, $\theta_1$ represents the contact angle between a drop of molten sulfur and the surface of an uncoated compressed disc of the fertilizer pellet, and $\theta_2$ represents the contact angle between a drop of molten sulfur and the surface of a compressed disc of the fertilizer pellet dusted with the finely divided powder subcoating, all contact angles being determined by the Thiokol Sulfur/Fertilizer Contact Angle Test.

5. Sulfur-encapsulated fertilizer pellets according to claim 1, in which the weight of the finely divided powder subcoating is in the range from about 0.2 to about 3 percent by weight, based on the weight of the inner core fertilizer pellet.

6. Sulfur-encapsulated fertilizer pellets according to claim 1, in which the weight of the finely divided powder subcoating is in the range from about 0.2 to about 3 percent by weight, and the weight of the sulfur coating is in the range from about 5 to about 14 percent by weight, all percentages being based on the weight of the inner core fertilizer pellet.

7. Sulfur-encapsulated fertilizer pellets adapted for use in soil to provide a controlled dissolution of the fertilizer nutrients at a rate predetermined for the metabolic needs of a crop plant, each of which sulfur-encapsulated fertilizer pellets comprises (a) an inner core of a solid fertilizer pellet, (b) from about 0.2 to about 3 percent by weight of a subcoating immediately adjacent to and surrounding the inner core fertilizer pellet and comprising a finely divided powder having an average particle size less than 1µ and capable of reducing the contact angle between the surface of the underlying fertilizer pellet and molten sulfur, (c) from about 5 to about 14 percent by weight of a coating of elemental sulfur substantially completely encapsulating the powder-subcoated fertilizer pellet, and (d) from about 0.1 to about 5 percent by weight of a surcoating of a hydrophobic sealant immediately adjacent to and surrounding the sulfur coating, the aggregate weight of all such coatings surrounding the fertilizer pellet not exceeding 16 percent by weight, all percentages being based on the weight of the inner core fertilizer pellet.

8. Sulfur-encapsulated fertilizer pellets adapted for use in soil to provide a controlled dissolution of the fertiltzer nutrients at a rate predetermined for the metabolic needs of a crop plant, each of which sulfur-encapsulated fertilizer pellets comprises (a) an inner core of a solid fertilizer pellet, (b) a subcoating immediately adjacent to and surrounding the inner core fertilizer pellet and consisting essentially of carbon black having an average particle size less than 1µ and capable of reducing the contact angle between the surface of the underlying fertilizer pellet and molten sulfur, and (c) a coating of elemental sulfur substantially completely encapsulating the carbon black-subcoated fertilizer pellet, the aggregate weight of all of the coating surrounding the fertilizer pellet not exceeding 16 percent by weight, based on the weight of the inner core fertilizer pellet.

9. Sulfur-encapsulated fertilizer pellets according to claim 8, in which the weight of the carbon black-subcoating is in the range from about 0.2 to about 3 percent by weight, based on the weight of the inner core fertilizer pellet.

10. Sulfur-encapsulated fertilizer pellets according to claim 8, in which the weight of the carbon black-subcoating is in the range from about 0.2 to about 3 percent by weight, and the weight of the sulfur coating is in the range from about 5 to about 14 percent by weight, all percentages being based on the weight of the inner core fertilizer pellet.

11. Sulfur-encapsulated fertilizer pellets adapted for use in soil to provide a controlled dissolution of the fertilizer nutrients at a rate predetermined for the metabolic needs of a crop plant, each of which sulfur-encapsulated fertilizer pellets comprises (a) an inner core of a solid fertilizer pellet, (b) from about 0.2 to about 3 percent by weight of a subcoating immediately adjacent to and surrounding the inner core fertilizer pellet and consisting essentially of carbon black having an average particle size of about 17 mµ, (c) from about 5 to about 10 percent by weight of a coating of elemental sulfur substantially completely encapsulating the carbon black-subcoated fertilizer pellet and (d) from about 0.1 to about 5 percent by weight of a surcoating of a hydrophobic sealant immediately adjacent to and surrounding the sulfur coating, the aggregate weight of all of such coating surrounding the fertilizer pellet not exceeding 16 percent by weight, all percentages being based on the weight of the inner core fertilizer pellet.

12. Sulfur-encapsulated fertilizer pellets according to claim 11, in which the inner core fertilizer pellet is spheroidized urea.

13. A process for the production of sulfur-encapsulated fertilizer pellets adapted for use in soil to provide a controlled dissolution of the fertilizer nutrients at a rate predetermined for the metabolic needs of a crop plant, which process comprises (a) dusting solid fertilizer pellets with from about 0.2 to about 3 percent by weight of a finely divided powder having an average particle size less than 1µ and capable of reducing the contact angle between the surface of the underlying fertilizer pellet and molten sulfur, thereby forming a powder subcoating immediately adjacent to and surrounding each fertilizer pellet, and (b) coating the powder-subcoated fertilizer pellets with from about 5 to about 14 percent by weight of molten elemental sulfur to substantially completely encapsulate each powder-subcoated fertilizer pellet with a coating of elemental sulfur, and then cooling the resultant sulfur-encapsulated fertilizer pellets to solidify the sulfur coating, the aggregate weight of all of the coatings applied to the fertilizer pellets not exceeding 16 percent by weight, all percentages being based on the weight of the uncoated fertilizer pellets.

14. The process for the production of sulfur-encapsulated fertilizer pellets according to claim 13, in which the finely divided powder used to dust the fertilizer pellets to form the subcoating is characterized by a roughness factor not less than 1.1 when computed in accordance with the following formula $$r = \frac{\cos \theta_2}{\cos \theta_1}$$

where $r$ represents the roughness factor, $\theta_1$ represents the contact angle between a drop of molten sulfur and the surface of an uncoated compressed disc of the fertilizer pellets, and $\theta_2$ represents the contact angle between a drop of molten sulfur and the surface of a compressed disc of the fertilizer pellet dusted with the finely divided powder subcoating, all contact angles being determined by the Thiokol Sulfur/Fertilizer Contact Angle Test.

15. A process for the production of sulfur-encapsulated fertilizer pellets adapted for use in soil to provide a controlled dissolution of the fertilizer nutrients at a rate predetermined for the metabolic needs of a crop plant, which process comprises (a) dusting solid fertilizer pellets with from about 0.2 to about 3 percent by weight of a finely divided powder having an average particle size less than 1μ and capable of reducing the contact angle between the surface of the underlying fertilizer pellet and molten sulfur, thereby forming a powder subcoating immediately adjacent to and surrounding each fertilizer pellet, (b) coating the powder-subcoated fertilizer pellets with from about 5 to about 14 percent by weight of molten elemental sulfur to substantially completely encapsulate each powder-subcoated fertilizer pellet with a coating of elemental sulfur, and then cooling the resultant sulfur-encapsulated fertilizer pellets to solidify the sulfur coating, and (c) coating the resultant powder-subcoated, sulfur-encapsulated fertilizer pellets with from about 0.1 to about 5 percent by weight of a hydrophobic sealant to form a surcoating substantially completely surrounding the sulfur coating, the aggregate weight of all of the coatings applied to the fertilizer pellets not exceeding 16 percent by weight, all percentages being based on the weight of the uncoated fertilizer pellets.

16. A process for the production of sulfur-encapsulated fertilizer pellets adapted for use in soil to provide the controlled dissolution of the fertilizer nutrients at a rate predetermined for the metabolic needs of a crop plant, which process comprises (a) dusting solid fertilizer pellets with from about 0.2 to about 3 percent by weight of carbon black having an average particle size of about 17 mμ and capable of reducing the contact angle between the surface of the underlying fertilizer pellet and molten sulfur, thereby forming a carbon black-subcoating immediately adjacent to and surrounding each fertilizer pellet, (b) coating the carbon black-subcoated fertilizer pellets with about 5 to about 14 percent by weight of molten elemental sulfur to substantially completely encapsulate each carbon black-subcoated fertilizer pellet with a coating of elemental sulfur, and then cooling the resultant sulfur-encapsulated fertilizer pellets to solidify the sulfur coating, and (c) coating the resultant carbon black-subcoated, sulfur-encapsulated fertilizer pellets with from about 0.1 to about 5 percent by weight of a soft wax to form a surcoating substantially completely surrounding the sulfur coating, the aggregate weight of all of the coatings applied to the fertilizer pellets not exceeding 16 percent by weight, all percentages being based on the weight of the uncoated fertilizer pellets.

References Cited
UNITED STATES PATENTS

| | | | |
|---|---|---|---|
| 3,192,031 | 6/1965 | Zaayenga | 71—64FX |
| 3,295,950 | 1/1967 | Blouin et al. | 71—64F |

REUBEN FRIEDMAN, Primary Examiner

R. BARNES, Assistant Examiner

U.S. Cl. X.R.

71—64